United States Patent Office 3,463,759
Patented Aug. 26, 1969

3,463,759
METHOD FOR THE PREPARATION OF RUBBER-LIKE ELASTIC URETHANE POLYMERS
Hans A. Peters, Stieglitzstrasse 20,
6078 Neu-Isenburg, Germany
No Drawing. Filed Dec. 7, 1965, Ser. No. 512,242
Claims priority, application Germany, Dec. 14, 1964,
Z 11,231
Int. Cl. C08g 22/04
U.S. Cl. 260—75
7 Claims

ABSTRACT OF THE DISCLOSURE

Rubberlike elastic polymers containing urethane groups and which are capable of formation from solution, are prepared by reacting an isocyanate-modified polyhydroxy compound containing at least two terminal isocyanate groups with a diamine bifunctional chain-extending and cross-linking agent in the presence of ammonia comprising from about 0.01 to 0.7 mol per mol of diamine.

---

This invention relates to an improved method for the manufacture of rubberlike elastic polymers containing urethane groups, which are capable of being formed out of solution. More particularly, the invention concerns the preparation of such polymers by conversion of isocyanate-modified polyhydroxy compounds containing at least two terminal isocyanate groups with bifunctional chain-extending and cross-linking agents, in the presence of ammonia.

The present invention is concerned with the preparation of highly elastic polymers from polyurethanes. Polymers of this type are formed in accordance with known methods by the conversion of isocyanate-modified polyhydroxy compounds with compounds capable of reacting bifunctionally with reference to isocyanate groups, which are mostly dissolved in a polar organic solvent. In this manner there takes place a chain extension or cross-linking of the molecule to a high polymer body. Often there are also added to the bifunctional compounds, polyfunctional, i.e., trifunctional substances. Examples of chain extending or cross-linking substances include dialcohols, diamines, and the like, as well as also water.

As isocyanate components there are conventionally employed isocyanate-modified polyhydroxy compounds, with preferably two terminal NCO-groups, the so-called macro-di-isocyanates, having a molecular weight lying between about 500 and 8000. Examples of polyhydroxy compounds for this purpose include polyesters, polyester-amides, polyethers, polythio-ethers, polycarbonates and polyacetals.

The possible combinations of the reaction participants for cross-linking and chain extension reactions are strongly limited owing to the high reaction velocity between the amines and the isocyanates. If, for example, the very reactive aliphatic amines are reacted with the likewise very reactive aromatic isocyanates, especially in combination with polyesters, the reaction leads even with intense cooling to a gel-like product, which is no longer soluble. Many attempts have been made in the prior art to regulate the reaction in such a way that the amounts of reactants involved were present in proportion to their reactivity. Thus, less active isocyanates have been combined with active amines, and vice versa, or else the reactivity of the isocyanate component has been reduced by a suitable choice of polyhydroxy compounds, and that of the amines by substitution. In most cases, the reaction can also be controlled through reaction-kinetic expedients. This is however quite costly on an industrial scale because of the complicated equipment required.

In addition, isocyanate-modified polyhydroxy compounds have been converted with less active hydrazide compounds. This reaction occurs favorably, however, only by the use of very dilute solutions, so that it is necessary to distill off excess solvent prior to spinning. A three-stage process has been proposed in order to arrive directly at a concentrated solution. In the first stage, high molecular, chiefly linear polyhydroxy compounds are reacted with an excess of aromatic di-isocyanate. In the second stage the resulting product is converted in a polar solvent by means of a chain-extending agent into a compound having an excess of NH—NH$_2$ groups. In the third stage, the terminal NH—NH$_2$ groups are reacted at room temperature with a further polyisocyanate of low reactivity. In this way highly elastic fibers with improved properties can be obtained. However, the process is confined to chain extending agents which are derivatives of hydrazine, and the need for three stages renders the process unduly complicated.

All the known methods possess the disadvantage that the range of selection of reactants is limited, and this has, prior to the present invention, prevented the use of desirably reactive components.

In accordance with the present invention, it was found that by the addition of small amounts of ammonia the aforementioned extending or cross-linking reactions of isocyanate-modified organic compounds with compounds acting bifunctionally in regard to isocyanate reactions, such as diamines, dialcohols, water, and the like, are strongly retarded. This is especially surprising since fundamentally amines, as well as tertiary amines and quaternary ammonium compounds are strong accelerators for isocyanate reactions, and ammonia constitutes the simplest amine. This action of ammonia is also astonishing since heretofore only acids were employed as reaction retarders for isocyanate reactions.

In accordance with the invention, there is provided a novel method for the manufacture of rubberlike elastic polymers containing urethane groups, and which are capable of formation from solution, by the conversion of isocyanate-modified polyhydroxy compounds which contain at least two terminal isocyanate groups, with bifunctional chain-extending or cross-linking agents, which comprises regulating the reaction velocity by the addition of from about 0.01 to about 0.7 mol of ammonia per mol of chain-extending or cross-linking agent.

The addition of the ammonia, in accordance with the invention, numerous reactive components can now be made to react under favorable conditions, such as, for example, macro-di-isocyanates based on polyesters, aromatic di-isocyanates with very reactive aliphatic diamines (ethylenediamine, 1,3-diaminopropane, 1,4-diaminobutane, and also the corresponding long chain and branched chain diamines) at room temperature and also at elevated temperatures. Aromatic diamines may also be employed, for example, 4,4'-diaminodiphenylmethane or p-phenylenediamine. The resulting solutions can be transformed into valuable products by either solution-spinning or dry-spinning methods.

Moreover, even if hydrazine or aromatic diamines are introduced after addition of the ammonia, cooling of the reaction mixture to temperatures of —10° to 0° C. is no longer required. Thus the expensive reaction-kinetic expedients are rendered superfluous.

In accordance with the method of the invention, the ammonia is introduced dissolved in water or in an organic solvent, or else in gaseous form. The ammonia may also be introduced in solid form in the form of solid materials liberating ammonia in solution or at elevated temperatures, for example, ammonium magnesium phosphate, hexamethylenetetramine, molecular sieves loaded with ammonia, amine salts, and complex ammonium salts of metals such as copper, zinc, cobalt, nickel and the like, all for the purpose of retarding the reaction. The amount of ammonia most advantageous for retarding the reaction depends upon the type of the reaction mixture and the temperature employed. The reaction velocity can be controlled corresponding to the amount of ammonia introduced. Advantageous dosages of ammonia lie in the range of about 0.002 to about 2.0, preferably about 0.01 to about 0.70 mols $NH_3$ per mole of chain-extending or cross-linking agent.

The advantages of the present invention include the following: It makes practicable the introduction of the most active aliphatic amines. This means in many cases a cost reduction in the process because of more favorable raw material costs. The combination of the most active components makes possible the preparation of materials with a wide range of mechanical and chemical properties and especially good workability.

By the reaction of these most active components, intensive cooling and reaction-kinetic expedients become unnecessary. This, in turn, permits economies in energy and in simplification of the process steps and apparatus. A further considerable saving of energy is obtained in that the solution employed for the final dry or wet spinning no longer needs to be rewarmed from low temperatures, such as $-10°$ C. to reach the favorable spinning temperature of $70°$–$90°$ C. The method of the invention permits polymerization and spinning temperatures to be the same.

As against acids as a retarding agent, the ammonia has the advantage that it also serves as the retardant for reactions with amines. Acids, as is known, neutralize a portion of these amines, and are thereby rendered inactive to a considerable extent, yielding products with unfavorable properties.

The following examples illustrate the practice of the invention, but are not to be regarded as limiting:

EXAMPLE 1

50 g. of polyester made from ethylene glycol and adipic acid having terminal hydroxy groups and a molecular weight of 2000 and a hydroxyl number of 56 and an acid number of 1, were dehydrated in a 250 ml. three-necked flask within 1 hour at 170° C. and at a pressure of 1 mm. Hg. After cooling to 90° C. there were added 12.7 g. diphenylmethane-4,4'-di-isocyanate. The reaction mixture was heated for another hour at 90° C. with stirring and while passing in nitrogen. After stopping the heating there were added 100 ml. dimethylformamide, whereupon the mixture was cooled to 70° C. At 30° C. there was stirred into the mixture a mixture of 1 g. of 1,3-diaminopropane, 1.57 ml. of a solution of anhydrous ammonia in dimethylformamide (containing 0.028 g. $NH_3$) and 50 ml. dimethylformamide. The temperature of the reaction mixture soon rose to 37° C.

On the following day a viscous liquid was formed, which was spun into threads by a solution spinning process. As a precipitant there was employed a mixture of 30% dimethylformamide, and 70% water. Water was used as the final washing agent. After air drying and aging two days at 30° C. the material had the following mechanical properties:

1. Titer _____denier__ 90
2. Tear resistance _____g./den__ 0.65
3. Tensile elongation _____percent__ 600
4. Elastic recovery _____do____ 95

In a comparison test, in which 1,3-diaminopropane was used without the ammonia, the mixture promptly solidified to a gel.

EXAMPLE 2

Proceeding as in Example 1, instead of the ammonia dissolved in dimethylformamide, there was added 0.22 ml. of a 25% aqueous ammonia solution. From the viscous solution obtained, a thread could be spun which had the same rubberlike elastic qualities as the fiber obtained in Example 1.

EXAMPLE 3

Proceeding as in Example 2, the chain extending batch (containing 0.22 ml. of 25% aqueous ammonia solution) was introduced at a temperature of 90° C. After cooling of the high polymer solution to 40° C. a thread was obtained with the same rubberlike elastic properties as the threads of Examples 1 and 2.

EXAMPLE 4

A macro-di-isocyanate was prepared as described in Example 1, and dissolved in 100 ml. dimethylformamide. At 30° C. there was introduced with stirring a mixture of 1.25 g. hydrazine hydrate, 0.22 ml. of a 25% aqueous ammonia mixture, and 50 ml. dimethylformamide. The temperature of the mixture rose to 41° C. After 1 hour the solution was capable of being spun into threads by the wet spinning method. After the same after-treatment of the fibers as in Example 1, the following physical properties were measured:

1. Titer _____denier__ 80
2. Tear resistance _____g./den__ 0.5
3. Tensile elongation _____percent__ 600
4. Elastic recovery _____do____ 95

In a comparison test, in which the hydrazine hydrate was added without the ammonia, gel formation took place immediately on cooling to $-10°$ C.

EXAMPLE 5

A macro-di-isocyanate was prepared as described in Example 1, and dissolved in 100 ml. dimethylformamide. At 90° C. there was introduced with stirring a mixture of 3 g. 4,4'-diaminodiphenylmethane, 1.0 ml. of a solution of anhydrous ammonia in dimethylformamide (containing 0.018 g. $NH_3$) and 50 ml. dimethylformamide. The temperature of the reaction mixture soon rose to 93° C. After 4 hours threads could be spun by a solution spinning process with the following properties.

1. Titer _____denier__ 70
2. Tear resistance _____g./den__ 0.7
3. Tensile elongation _____percent__ 450
4. Elastic recovery _____do____ 95

EXAMPLE 6

Proceeding as in Example 1, a mixture of 2.5 g. p-phenylenediamine, 1.0 ml. of a solution of anhydrous ammonia in dimethylformamide (containing 0.018 g. $NH_3$) and 50 ml. dimethylformamide was introduced with stirring at a temperature of 80° C. After 4 hours threads could be spun by a solution spinning process with the following properties.

1. Titer _____denier__ 90
2. Tear resistance _____g./den__ 0.5
3. Tensile elongation _____percent__ 580
4. Elastic recovery _____do____ 95

What is claimed is:
1. Method for the preparation of rubberlike elastic polymers containing urethane groups and which are capable of formation from solution, comprising reacting an isocyanate-modified polyhydroxy compound containing at least two terminal isocyanate groups with a diamine bifunctional chain-extending and cross-linking agent in the presence of an amount of ammonia sufficient to regulate the reaction velocity and comprising from about 0.01 to about 0.7 mol of ammonia per mol of said chain-extending and cross-linking agent.

2. The method of claim 1 in which the ammonia is introduced into the reaction mixture in the form of an aqueous solution.

3. The method of claim 1 in which the ammonia is introduced in the form of a solid substance capable of liberating ammonia, in solution or at elevated temperatures.

4. The method of claim 1 in which the isocyanate-modified polyhydroxy compound is the reaction product of a polyester-diol with an aromatic di-isocyanate having a molecular weight between about 500 and 8000.

5. The method of claim 1 in which the chain-extending and cross-linking agent is an aliphatic diamine.

6. The method of claim 1 in which the chain-extending and cross-linking agent is an aromatic diamine.

7. The method of claim 1 in which the chain-extending and cross-linking agent is hydrazine.

References Cited

UNITED STATES PATENTS

| | | | |
|---|---|---|---|
| 2,886,555 | 5/1959 | Bunge et al. | 260—75 XR |
| 2,916,464 | 12/1959 | Ebneth et al. | 260—75 XR |
| 3,156,658 | 11/1964 | Gmitter | 260—75 XR |
| 3,157,621 | 11/1964 | Degginger | 260—77.5 |
| 3,342,757 | 9/1967 | Considine et al. | 260—77.5 |

DONALD E. CZAJA, Primary Examiner

M. J. WELSH, Assistant Examiner

U.S. Cl. X.R.

260—77.5